United States Patent
Datta et al.

(10) Patent No.: US 12,375,286 B2
(45) Date of Patent: Jul. 29, 2025

(54) DECENTRALIZED MULTI-AUTHORITY ATTRIBUTE-BASED ENCRYPTION FROM BILINEAR DIFFIE-HELLMAN ASSUMPTIONS

(71) Applicant: NTT Research, Inc., Sunnyvale, CA (US)

(72) Inventors: Pratish Datta, Sunnyvale, CA (US); Ilan Komargodski, Tel Aviv (IL); Brent Waters, Austin, TX (US)

(73) Assignee: NTT Research, Inc., Sunnyvale, CA (US)

(*) Notice: Subject to any disclaimer, the term of this patent is extended or adjusted under 35 U.S.C. 154(b) by 202 days.

(21) Appl. No.: 18/271,221

(22) PCT Filed: Jan. 5, 2022

(86) PCT No.: PCT/US2022/011311
§ 371 (c)(1),
(2) Date: Jul. 6, 2023

(87) PCT Pub. No.: WO2022/150386
PCT Pub. Date: Jul. 14, 2022

(65) Prior Publication Data
US 2024/0080203 A1 Mar. 7, 2024

Related U.S. Application Data

(60) Provisional application No. 63/134,475, filed on Jan. 6, 2021.

(51) Int. Cl.
*H04L 9/32* (2006.01)
*H04L 9/08* (2006.01)

(52) U.S. Cl.
CPC .......... *H04L 9/3236* (2013.01); *H04L 9/0866* (2013.01); *H04L 9/0894* (2013.01)

(58) Field of Classification Search
CPC ................. H04L 9/3073; H04L 9/0861; H04L 9/0894; H04L 9/085; H04L 9/0866; H04L 9/3236; H04L 9/14; H04L 9/16; H04L 63/0428
See application file for complete search history.

(56) References Cited

U.S. PATENT DOCUMENTS

| | | | |
|---|---|---|---|
| 12,200,110 B2* | 1/2025 | Yu ......................... | H04L 9/0819 |
| 2010/0185861 A1* | 7/2010 | Chase ..................... | H04L 9/083 |
| | | | 713/171 |
| 2014/0289513 A1* | 9/2014 | Huang ................... | H04L 9/3073 |
| | | | 713/160 |
| 2015/0318988 A1* | 11/2015 | Kawai ................... | H04L 9/3247 |
| | | | 380/44 |

(Continued)

OTHER PUBLICATIONS

International Search Report and Written Opinion of the International Searching Authority in PCT/US2022/011311 (16 pgs).

*Primary Examiner* — Tae K Kim
(74) *Attorney, Agent, or Firm* — CipherLaw

(57) ABSTRACT

The invention relates to systems, methods, network devices, and machine-readable media for encrypting and decrypting messages in a decentralized multi-authority attribute-based encryption (MA-ABE) scheme for access structures described by monotone LSSS under the decisional bilinear Diffie-Hellman assumptions. The construction can also be modified to obtain an MA-ABE scheme under computational bilinear Diffie-Hellman assumptions.

20 Claims, 4 Drawing Sheets

(56) References Cited

U.S. PATENT DOCUMENTS

| | | | |
|---|---|---|---|
| 2016/0234012 A1* | 8/2016 | Kawai | H04L 9/0861 |
| 2018/0367305 A1* | 12/2018 | Gouget | G07C 13/00 |
| 2020/0076787 A1* | 3/2020 | D'Souza | H04L 63/104 |
| 2020/0313856 A1 | 10/2020 | Basu et al. | |
| 2023/0379153 A1* | 11/2023 | Datta | H04L 9/3093 |

* cited by examiner

DECENTRALIZED MULTI-AUTHORITY ATTRIBUTE-BASED ENCRYPTION FROM BILINEAR DIFFIE-HELLMAN ASSUMPTIONS

CROSS-REFERENCE TO RELATED APPLICATIONS

This application is a national stage application, filed under 35 U.S.C. § 371, of International Patent Application No. PCT/US2022/011311, filed Jan. 5, 2022, which claims the benefit of U.S. Provisional Application No. 63/134,475, filed Jan. 6, 2021, the contents of both of which are hereby incorporated in their entireties.

FIELD OF THE INVENTION

The present disclosure relates to decentralized multi-authority attribute-based encryption (MA-ABE) schemes for access structures described by monotone linear secret sharing Schemes (LSSS) under the decisional bilinear Diffie-Hellman assumptions. The construction can also be modified to obtain an MA-ABE scheme under computational bilinear Diffie-Hellman assumptions.

BACKGROUND OF THE INVENTION

Attribute-based encryption (ABE) is a generalization of traditional public-key encryption that offers fine-grained access control over encrypted data based on the credentials (or attributes) of the recipients. ABE comes in two avatars: ciphertext-policy and key-policy. In a ciphertext-policy ABE (CP-ABE), as the name suggests, ciphertexts are associated with access policies and keys are associated with attributes. In a key-policy ABE (KP-ABE), the roles of the attribute sets and the access policies are flipped, i.e., ciphertexts are associated with attributes and keys are associated with access policies. In both cases, decryption is possible only when the attributes satisfy the access policy. Moreover, it is required that given any ciphertext created with respect to an access policy, no group of colluding users none of whom individually possesses a secret key corresponding to an attribute set satisfying the access policy, should be able to decipher the encrypted message. This property is known as collusion resistance.

Since its inception by Goyal, Pandey, Sahai and Waters, ABE has become a fundamental cryptographic primitive with a long list of potential applications. Therefore, the task of designing ABE schemes has received tremendous attention by the cryptographic community resulting in a long sequence of works achieving various trade-offs between expressiveness, efficiency, security, and underlying assumptions.

Multi-Authority ABE

There is one major limitation in a standard ABE scheme: In an ABE scheme, each user must go to the single master authority and prove that he has a certain set of attributes in order to receive the secret keys corresponding to each of those attributes. This means we must have one trusted authority who monitors all attributes e.g. driver's licenses, voter registration, and college enrollment. In reality, however, there are different entities responsible for issuing and maintaining the different attributes, e.g. the DMV is the controller of driver licenses and similarly the Board of Elections and the University office for the other two attributes, respectively. Therefore, we would want to be able to entrust each of the attributes to a different (and perhaps not entirely trusted) authority.

To address the above problem, the notion of multi-authority ABE (MA-ABE) schemes was introduced. In an MA-ABE, there are multiple authorities which control different attributes and each of them can issue secret keys to users possessing attributes under their control without any interaction with the other authorities in the system. Given a ciphertext generated with respect to some access policy, a user possessing a set of attributes satisfying the access policy can decrypt the ciphertext by pulling the individual secret keys it obtained from the various authorities controlling those attributes. The security requires collusion resistance against unauthorized users as described above with the important difference that now some of the attribute authorities may be corrupted and therefore may collude with the adversarial users.

Building MA-ABE schemes turned out to be somewhat challenging. After few initial attempts that had various limitations, Lewko and Waters were able to design the first truly decentralized MA-ABE scheme in which any party can become an authority and there is no requirement for any global coordination other than the creation of an initial trusted setup. In their scheme, a party can simply act as an authority by publishing a public key of its own and issuing private keys to different users that reflect their attributes. Different authorities need not even be aware of each other and they can join the system at any point of time. There is also no bound on the number of attribute authorities that can ever come into play during the lifetime of the system. Their scheme supports all access policies computable by $NC^1$ circuits. For security, they rely on the random oracle model and additionally they work with composite-order bilinear groups whose order is the product of three primes and its security is derived under various instances of the general subgroup decision assumptions and another new computational assumption introduced by them. This implies that fairly large parameters will be needed in order to have a meaningful level of security. Consequently, it became desirable to design decentralized MA-ABE schemes in bilinear groups of prime order which provide drastically better performance compared to their composite-order counterparts.

One particular challenge has been basing MA-ABE for expressive access policies, e.g. for $NC^1$, under the same assumptions as standard "centralized" ABE schemes are based on. One prominent gap that remains wish respect to this question is basing MA-ABE for expressive access policies, e.g. $NC^1$, on the decisional or computational bilinear Diffie-Hellman assumptions (DBDH or CBDH), similarly to the centralized ABE. (The decision version of BDH asks to distinguish $e(g, g)^{abc}$ from a random (target) group element given random $(g, g^a, g^b, g^c)$, while the search version asks to compute $e(g, g)^{abc}$ given $(g, g^a, g^b, g^c)$.) All assumptions previously used to get MA-ABE are potentially stronger and much less standard: they are either (1) using novel q-type assumptions which in addition to being less standard are known to be non-trivially vulnerable to attacks, or (2) decisional assumptions with no natural "search" variant and where the target of the assumption is in the source group. (If $e: \mathbb{G} \times \mathbb{G} \to \mathbb{G}_T$ is a bilinear map, then we refer to elements in $\mathbb{G}$ as being in the source group or bilinear group.)

Specifically, in decision linear (DLIN), the target of the group is in the source group while in C/DBDH the target is in the target group. (In DLIN it is assumed to be hard to distinguish between $g^{a+b}$ from a random (source) group element given random elements (g, v, w, $v^a$, $w^b$) in the source group.) This difference might seem syntactic, but experience has shown that techniques involved in target-based assumptions can often be translated to other settings, such as ones based on lattices. Further, DLIN-style assumptions have no search-version analog (as CBDH is to DBDH).

Additionally, q-type assumptions are vulnerable to non-trivial attacks that recover the secret involved in a q-type assumption in time inversely proportional to q. Hence, the parameters of any q-type-assumption-based cryptographic constructions must scale with q. In particular, in the some cases, the size of the q-type assumption scales with the complexity of the access policies associated with the ciphertext in the scheme which means that all parameters must grow with the complexity of the supported access policies.

A recent work of Datta et al. gave a construction of MA-ABE based on Learning With Errors (LWE) that overcomes the aforementioned two problems (since LWE is a standard assumption and its decision version reduces to search). However, it supports only DNF access policies. Furthermore, all previous constructions were proven secure in the random oracle model and additionally were based on decision assumptions such as the DLIN assumption, non-standard q-type assumptions, or subspace decision assumptions over composite-order bilinear groups. The invention described herein includes the first MA-ABE proven secure under the standard search variant of bilinear Diffie-Hellman (CBDH) and in the random oracle model. The scheme supports all access policies captured by $NC^1$ circuits.

BRIEF SUMMARY OF THE INVENTION

Some embodiments of the invention include systems, methods, network devices, and machine-readable media for encrypting a message according to a multi-authority attribute-based encryption scheme, including storing an electronic message m comprising $m_i$ bits for encryption in a computerized storage media; executing a global setup algorithm to generate global parameters by selecting a cryptographic bilinear group G and a cryptographic hash function H, wherein the group G comprises a generator g, and a bilinear map e, and further wherein h=e(g, g); executing an authority setup algorithm to generate a public and secret key pair, by: generating values a, $y_2 \ldots y_s$; and setting the public key to be ($h^a$, $g^{\{y_2\}}, \ldots, g^{\{y_s\}}$) and the secret key to be (a, $y_2, \ldots y_s$); executing a key generation algorithm given a user global identifier (GID), by: computing B=H(GID, 2)$^{\{y_2\}}$*H(GID, 3)$^{\{y_3\}}$* ... *H(GID, s)$^{\{y_s\}}$; outputting $g^a$*B as a secret key; executing an encryption algorithm for the message m, the message m structured as one or more group elements, on access policy M, by: for each group element $m_i$ of message m: generating an integer r; generating a vector of integers v=(z, $v_2, \ldots, v_s$); generating a vector of integers x=($x_2, \ldots, x_s$); computing: $C_0 = h^z * m_i$; $C_1 = h^{\{M^*v\}} * h^{\{a^*r\}}$; $C_2 = g^r$; and for every j in 2 ... s: $C'_j = g^{\{v^*r\}} * g^{\{M_j^*x_j\}}$; and storing ($C_0, C_1, C_2, C'_2, \ldots C'_s$) as the encrypted message of $m_i$ in a computerized media.

Some further embodiments can include distributing the secret key over a communications network by only one authority. In some further embodiments, each user is identified by a set of attributes and a decryption ability for each encrypted message is based on a function of the attributes. Some further embodiments include distributing the secret key k over a communications network by any polynomial number of independent authorities. Some further embodiments include selecting, for each independent authority, a predetermined number and a set of attributes whereby the user can only decrypt the message m if the user has at least the predetermined number of attributes from each authority.

Some embodiments of the invention include systems, methods, network devices, and machine-readable media for decrypting a message according to a multi-authority attribute-based encryption scheme, including storing a message in a computerized storage media comprising group elements $m_i$ representing ($C_0, C_1, C_2, C'_2, \ldots C'_s$), the message having been encrypted according to an attribute-based encryption scheme; retrieving a secret key k from the computerized storage media; executing a decryption algorithm given a user global identifier (GID), wherein: to decrypt the $i^{th}$ group element of the message: computing D=e(H(GID, 2), $C'_2$)* ... *e(H(GID, s), $C'_s$); computing F=$C_1$*D; computing J=e(k, $C_2$); computing $C_0$*J/F; and storing the decrypted message in the computerized storage media.

Some further embodiments include distributing the secret key k over a communications network by only one authority. In some further embodiments, each user is identified by a set of attributes and a decryption ability for each encrypted message is based on a function of the attributes. Some further embodiments include distributing the secret key k over a communications network by any polynomial number of independent authorities. Some further embodiments include selecting, for each independent authority, a predetermined number and a set of attributes whereby the user can only decrypt the message m if the user has at least the predetermined number of attributes from each authority.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

Figure 1:
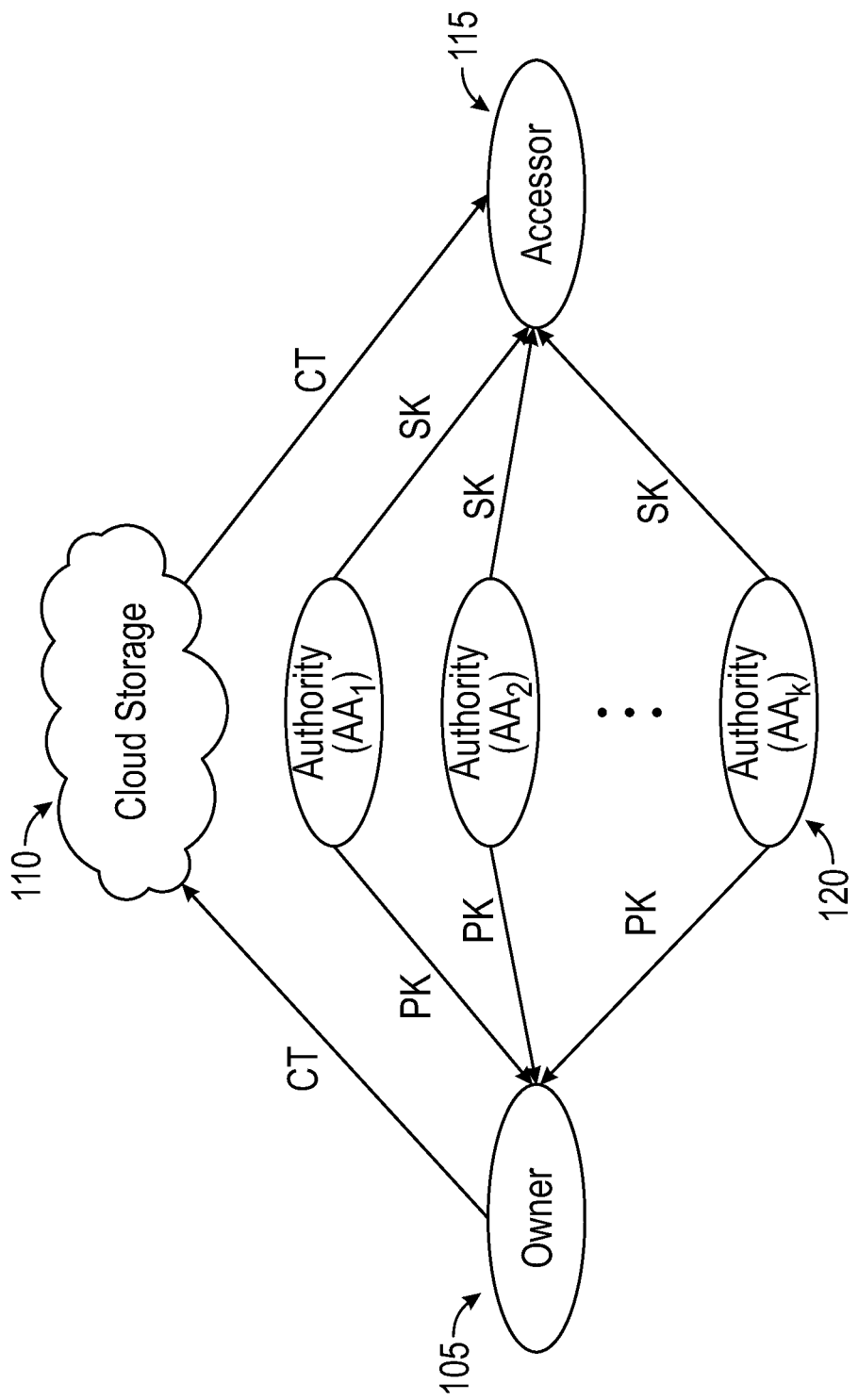
FIG. 1 illustrates an example system architecture for a decentralized multi-authority attribute-based encryption scheme.

Described herein are methods for basing MA-ABE for expressive access policies under more standard or "simpler" assumptions. Decentralized multi-authority attribute-based encryption (MA-ABE) is a strengthening of standard ciphertext-policy attribute-based encryption so that there is no trusted central authority: any party can become an authority and there is no requirement for any global coordination other than the creation of an initial set of common reference parameters. Essentially, any party can act as an authority for some attribute by creating a public key of its own and issuing private keys to different users that reflect their attributes.

In a standard ABE scheme, keys can only be generated and issued by a central authority. A natural extension of this notion, termed multi-authority ABE (MA-ABE), allows multiple parties to play the role of an authority. In an MA-ABE scheme, there are multiple authorities which control different attributes and each of them can issue secret keys to users possessing attributes under their control without any interaction with the other authorities in the system. Specifically, given a ciphertext generated with respect to some access policy, a user possessing a set of attributes satisfying the access policy can decrypt the ciphertext by pulling the individual secret keys it obtained from the various authorities controlling those attributes. The security requires the usual collusion resistance against unauthorized users with the important difference that now some of the attribute authorities may be corrupted and therefore may collude with the adversarial users.

Disclosed herein are systems and methods for a decentralized MA-ABE scheme for $NC^1$ access policies relying only on the simple static search BDH assumption (and in the random oracle model, as all previous constructions). In this MA-ABE scheme, any party can become an authority at any point of time and there is no bound on the number of attribute authorities that can join the system or need for any global coordination other than the creation of an initial set of common reference parameters created during a trusted setup. We only obtain static security where all of the ciphertexts, secret keys, and corruption queries must be issued by the adversary before the public key of any attribute authority is published. Notably, currently, the only known technique to achieve adaptive security for ABE is Waters' "dual system encryption" methodology which crucially relies on the hidden subgroup or subspace structure.

Theorem 1 (Informal)

There exists a statically-secure decentralized MA-ABE scheme supporting all access policies captured by $NC^1$ circuits in prime-order bilinear groups in the random oracle model assuming the computational bilinear Diffie-Hellman (CBDH) assumption.

Techniques

Described here are the techniques for instantiating decentralized MA-ABE under the decisional BDH assumption. The construction based on the computational (search) variant of BDH (i.e., CBDH) follows by standard techniques involving a hardcore bit function for the CBDH problem.

Background

Before explaining how we obtain our construction, let us give some background on MA-ABE schemes. Our MA-ABE (like all other known MA-ABE schemes) is designed under the assumption that each user in the system has a unique global identifier GID coming from some universe of global identifiers $\mathcal{GID} \subset \{0, 1\}^*$. We shall further assume (without loss of generality) that each authority controls just one attribute, and hence we can use the words "authority" and "attribute" interchangeably. We denote the authority universe by $\mathcal{AU}$.

First, let us recall the syntax of decentralized MA-ABE for $NC^1$ access policies, which is well known to be realizable by (monotone) linear secret sharing schemes (LSSS). A decentralized MA-ABE scheme consists of five procedures: GlobalSetup, AuthSetup, KeyGen, Enc, and Dec. The GlobalSetup procedure gets as input the security parameter (in unary encoding) and outputs global parameters. All of the other procedures depend on these global parameters (we may sometimes not mention them explicitly when they are clear from context). The AuthSetup procedure can be executed by any authority $u \in \mathcal{AU}$ to generate a corresponding public and secret key pair, $PK_u$ and $SK_u$. At this point, an authority holding the secret key $SK_u$ can generate a secret key $SK_{GID,u}$ for a user with global identifier GID. At any point in time, using the public keys $\{PK_u\}$ of some authorities, one can encrypt a message msg relative to some linear secret sharing policy $(M, \rho)$, where M is the policy matrix and $\rho$ is the function that assigns row indices in the matrix to attributes controlled by those authorities, to get a ciphertext CT. Finally, a user holding a set of secret keys $\{SK_{GID,u}\}$ (relative to the same GID) can decrypt a given ciphertext CT if and only if the attributes corresponding to the secret it possesses "satisfy" the access structure with which the ciphertext was generated. If the MA-ABE scheme is built in the random oracle model, as is described herein, and in all previous collusion resistant MA-ABE schemes, the existence of a public hash function H mapping the global identifiers in $\mathcal{GID}$ to some appropriate space is considered. This hash function H is generated by GlobalSetup and is modeled as a random oracle in the security proof.

Just like standard ABE, the security of an MA-ABE scheme demands collusion resistance, that is, no group of colluding users, none of whom is individually authorized to decrypt a ciphertext, should be able to decrypt the same when they pull their secret key components together. However, in case of MA-ABE, it is further required that collusion resistance should hold even if some of the attribute authorities collude with the adversarial users and thereby those users can freely obtain secret keys corresponding to the attributes controlled by those corrupt authorities. Decentralized MA-ABE further allows the public and secret keys of the corrupt authorities to be generated in a malicious way and still needs collusion resistance. This is crucial since, in a decentralized MA-ABE scheme, anyone is allowed to act as an attribute authority by generating its public and secret keys locally and independently of everyone else in the system.

The inventive ABE scheme described herein can be configured to be collusion resistant, as described above. The standard technique to achieve this is to use the randomness of KeyGen to tie together the secret key components corresponding to the various attributes of a user to stop collusion attacks by mixing and combining the secret key components held by multiple users.

In the centralized setting, where there is a single authority holding the master secret key and generating keys for particular sets of attributes, this is usually done by tying together the different key components representing the different attributes of a user with the help of fresh randomness specific to that user. Such randomization would make the different key components of a user compatible with each other, but not with the parts of a key issued to another user. This seems to be problematic in the decentralized, multi-authority, ABE setting since there is no single master authority generating randomness. More precisely, a decentralized MA-ABE attempts to simultaneously allow anyone to generate authority keys (without even being aware of the existence of other authorities in the system) and at the same time maintain collusion resistance.

Previous decentralized MA-ABE schemes use the output of a public hash function H applied on the user's global identity (the GID) as the randomness tying together multiple key components issued by different authorities. This is what necessitates the use of the random oracle model, that is, assume the hash function H can actually output good randomness. However, this means that the randomness responsible for tying together the different key components must be publicly computable (even by the attacker). This public computability requirement clearly makes this strategy of tying together the different key components of a user more challenging compared to the centralized, single-authority setting.

This challenge has been overcome in prior decentralized MA-ABE schemes as follows. Those schemes consider a random oracle H that maps each global identifier GID to a (bilinear) group element. Their idea was then to structure the decryption mechanism at each node v of the policy circuit associated with the ciphertext such that a user will recover a target group element of the form $e(g, g)^{sh_v} \cdot e(g, H(GID))^{sh'_v}$. This group element first contains a secret share $sh_v$ of a secret z in the exponent, and these shares can be combined to reconstruct the secret and recover the message. Each of these is "blinded" by a share $sh'_v$, which is a share of 0 in the exponent with base $e(g, H(GID))$. This structure allows for the decryption algorithm to both reconstruct the main secret z and to unblind it in parallel. If a user with a particular identifier GID satisfies the access tree, it can reconstruct z in the exponent by raising the group elements to the proper reconstruction coefficients. At the same time, this operation will reconstruct the share of 0 and thus the $e(g, H(GID))$ terms will cancel out. Intuitively, if two users with different global identifiers GID, GID' attempt to collude, the cancellation will not work since the $sh'_v$ shares will have different bases.

While arguing security, the absence of coordination among multiple attribute authorities and the existence of malicious ones also makes the reduction more challenging compared to a single-authority ABE scheme. We borrow ideas from the proof techniques of Rouselakis and Waters. Recall that they achieved (static) security under a q-type assumption by extending the "program and cancel" technique in an application of the "partitioning" methodology. Roughly speaking, in the partitioning technique the simulator of the reduction sets up the public parameters of the systems in such a way that the powerset of the attribute universe is partitioned into two disjoint sets: One for which the simulator can create the set secret keys and answer the attacker's queries, and one for which this is not possible, where the challenge query should belong. Since Rouselakis and Waters considered the static security model, the simulator knows in advance the required challenge set and therefore the suitable partition. However, since in a decentralized MA-ABE the public keys of corrupt authorities are generated by the adversary and thus the simulator cannot program them directly. Therefore, it is necessary to somehow make the components of the challenge ciphertext corresponding to the corrupted authorities independent of the secret used to generate the challenge ciphertext.

Rouselakis and Waters resolved this challenge by introducing an information-theoretic transformation that converts any linear secret sharing policy (M, ρ) and any subset of rows in M which corresponds to an unauthorized set into another linear secret sharing policy (M', ρ) where some of the columns of the unauthorized rows are zeroed-out. This transformation allows the simulator of the security reduction to isolate the corrupted rows of the challenge access policy and essentially ignore it for the simulation.

Static vs. Selective Security

While the partitioning technique was successful in establishing selective security, that is, security against static ciphertext and adaptive key queries in case of single-authority ABE schemes, it can only support static key queries for MA-ABE. This is because in case of single-authority ABE, the secret key queries are naturally atomic, that is when a secret key query for a user is requested to the master authority, all the attributes possessed by that user are submitted at the same time. In contrast, in an MA-ABE scheme, when a user requests a secret key for some attribute to the authority controlling that attribute, it is not required to disclose the other attributes it possesses to the authority. Thus, adaptive key queries in the context of MA-ABE means that the adversary can adaptively request the different secret key components with respect to the same GID at different points of time without disclosing the other attributes for which it will request secret keys with respect to that GID later. This makes the programming of the secret keys seemingly difficult for the simulator.

The Inventive Approach for Basing Security Under DBDH

The design of the inventive MA-ABE scheme under DBDH implements a decryption algorithm that will blind each share of the secret masking the message in the ciphertext with a share of 0 in the exponent of a base that involves the hashed output of a particular GID so that decryption succeeds only when all secret keys used to decrypt a ciphertext correspond to the same GID. However, the primary challenge with realizing the above idea provably under DBDH is that we need a way for a reduction to embed the challenge access policy into the authority public keys in order to implement the partitioning strategy. Since the DBDH assumption gives the reduction fewer components to do this compared to a q-type assumption such as one used in, there is no obvious path for reducing the construction to DBDH. We surmount this obstacle by expanding our ciphertext and authority public key spaces. Our construction is parameterized by an integer $s_{max}$ that specifies the maximum number of columns in a linear secret sharing matrix, or alternatively, a bound on the number of AND gates in the corresponding $NC^1$ access policy. The authority public keys and ciphertext all grow linearly in $s_{max}$. This expansion of the authority public key and ciphertext spaces in turn requires us to expand the output space of the oracle H. More precisely, we consider $s_{max}$ random group elements for each GID which are defined as the output of H on (GID||j) for all $j \in [s_{max}]$. The lack of components in a DBDH problem instance, as opposed to a q-type assumption, also requires us to restrict the row-labeling function ρ of the linear secret sharing policies (M, ρ) to be injective which means that each attribute can appear within an access policy at most once. However, our scheme can be alleviated to one which allows an attribute to appear within an access policy a bounded number of times using an encoding technique. Our scheme is described as follows.

The inventive scheme is based on a bilinear group G=(q, $\mathbb{G}$, $\mathbb{G}_T$, g, e) of prime order q with a generator g where we shall assume that the DBDH assumption holds. The description of the bilinear group G as well as the description of H are part of the global setup.

In our scheme, whenever an authority $u \in \mathcal{AU}$ wants to create a secret and public key pair, it chooses $a_u, y_{u,2}, \ldots, y_{u,s_{max}} \leftarrow \mathbb{Z}_q$ and outputs the public key $PK_u$ and the master secret key $MSK_u$ as $$PK_u = (e(g,g)^{\alpha_u}, g^{y_{u,z}}, \ldots, g^{y_{u,s_{max}}}) \quad MSK_u = (\alpha_u, y_{u,2}, \ldots, y_{u,s_{max}}).$$

Then, to generate a certain secret key $SK_{GID,u}$ for an authority $u \in \mathcal{AU}$ and a user's global identifier GID, the authority computes $$SK_{GID,u} = g^{\alpha_u} \prod_{j=2}^{s_{max}} H(GID||j)^{y_{u,j}}.$$

To encrypt a message msg relative to an access policy (M, $\rho$), where M is a $\ell \times s_{max}$ matrix whose ith row is denoted $M_i$, we sample 1. $r_1, \ldots, r_\ell \leftarrow \mathbb{Z}_q$,
2. $v=(z, v_2, \ldots, v_{s_{max}}) \leftarrow \mathbb{Z}_q^{s_{max}}$ (for secret sharing the random mask z), and
3. $x=(x_2, \ldots, x_{s_{max}}) \leftarrow \mathbb{Z}_q^{s_{max}-1}$ (for secret sharing 0), and output $CT=((M, \rho), C_0, \{C_{1,i}\}_{i\in[\ell]}, \{C_{2,i}\}_{i\in[\ell]}, \{C_{3,i,j}\}_{i\in[\ell], j\in\{2,\ldots,s_{max}\}})$, where $C_0 = e(g,g)^z$ msg $\forall i \in [\ell]: C_{1,i} = e(g,g)^{M_i \cdot v} e(g,g)^{\alpha\rho(i)r_i}, C_{2,i} = g^{r_i}$ $\forall i \in [\ell], j \in \{2, \ldots, s_{max}\}: C_{3,i,j} = g^{y\rho(i),j r_i} g^{M_{i,j} x_j}$.

Finally, for decryption we verify that the given set of keys $\{SK_{GID,u}\}$ is authorized to decrypt the given ciphertext CT. If not, we abort. Denote by I the row indices in M which are available given the available secret keys. Then, we find scalars $\{w_i \in \mathbb{Z}_q\}_{i \in [I]}$ such that $\Sigma_{i \in [I]} w_i M_i = (1, 0, \ldots, 0)$ (which should exist since the set is authorized and we use linear secret sharing policy). Then, we compute and output $$C_0 / \prod_{i \in I} \left[ \frac{C_{1,i} \cdot \prod_{j=2}^{s_{max}} e(GID\|j), C_{3,i,j})}{e(SK_{GID,\rho(i)}, C_{2,i})} \right]^{w_i}.$$

Looking at the decryption equation above, observe that for each row $i \in I$ we recover $$e(g,g)^{M_i \cdot v} \overbrace{\prod_{j=2}^{s_{max}} e(g, H(GID\|j))^{M_{i,j} x_j}}^{\text{blinding factor}}.$$

If all these terms correspond to the same GID, then by exponentiating with the appropriate reconstruction coefficients $\{w_i\}_{i \in I}$, can recover the random mask z in the exponent of $e(g, g)$ and also do away with the blinding factors $\prod_{j=2}^{s_{max}} e(g, H(GID\|j))^{M_{i,j} x_j}$.

For proving security of the above construction, we first apply an information-theoretic transformation to reach a state where we can essentially ignore the rows of the challenge access matrix controlled by the corrupt authorities. After that, we carefully embed the DBDH instance into the public keys of uncorrupt authorities and components of the challenge ciphertext corresponding to those uncorrupt authorities. We partition the powerset of the set of uncorrupt authorities appearing in the challenge access policy by carefully embedding the challenge DBDH instance in such a way that we are able to simulate secret keys for any GID and subsets of those authorities which are unauthorized when combined with the rows controlled by the corrupt authorities.

Preliminaries

We will denote the underlying security parameter by $\lambda$. A function $negl: \mathbb{N} \to \mathbb{R}$ is negligible if it is asymptotically smaller than any inverse-polynomial function, namely, for every constant $c > 0$ there exists an integer $N_c$ such that $negl(\lambda) \leq \lambda^{-c}$ for all $\lambda > N_c$. We let $[n] = \{1, \ldots, n\}$.

Let PPT stand for probabilistic polynomial-time. For a distribution $\chi$, we write $x \leftarrow \chi$ to denote that x is sampled at random according to distribution $\chi$. For a set X, we write $x \leftarrow X$ to denote that x is sampled according to the uniform distribution over the elements of X. Also for any set X, we denote by $|X|$ and $2^X$ the cardinality and the power set of the set X respectively. We use bold lower case letters, such as v, to denote vectors and upper-case, such as M, for matrices. We assume all vectors, by default, are row vectors. The ith row of a matrix is denoted $M_i$ and analogously for a set of row indices I, we denote $M_I$ for the submatrix of M that consists of the rows $M_i$ for all $i \in I$.

For an integer $q \geq 2$, we let $\mathbb{Z}_q$ denote the ring of integers modulo q. We represent $\mathbb{Z}_q$ as integers in the range $(-q/2, q/2]$. The set of matrices of size $m \times n$ with elements in $\mathbb{Z}_q$ is denoted by $\mathbb{Z}_q^{m \times n}$. Special subsets are the set of row vectors of length n: $\mathbb{Z}_q^{1 \times n}$, and column vectors of length n: $\mathbb{Z}_q^{n \times 1}$. We denote by $v \cdot w$ the inner product of vector v and w, where each vector can either be a row or a column vector. The operation $(\cdot)^T$ denotes the transpose of vectors/matrices.

Bilinear Groups and Complexity Assumptions

The inventive MA-ABE construction works with instantiations of bilinear groups of prime order. Abstractly, let $\mathbb{G}$ and $\mathbb{G}_T$ be two multiplicative cyclic groups of prime order $q=q(\lambda)$, where the group operation is efficiently computable in the security parameter $\lambda$. Let g be a generator of $\mathbb{G}$ and $e: \mathbb{G} \times \mathbb{G} \to \mathbb{G}_T$ be an efficiently computable pairing function that satisfies the following properties:

Bilinearity: for all $u, v \in \mathbb{G}$ and $a, b \in \mathbb{Z}_q$ it is true that $e(u^a, v^b) = e(u, v)^{ab}$.

Non-degeneracy: $e(g, g) \neq 1_{\mathbb{G}_T}$, where $1_{\mathbb{G}_T}$ is the identity element of the group $\mathbb{G}_T$.

Let $\mathcal{G}$ be an algorithm that takes as input $1^\lambda$, the unary encoding of the security parameter $\lambda$; and outputs the description of a bilinear group $G=(q, \mathbb{G}, \mathbb{G}_T, g, e)$.

Our security proof of our proposed MA-ABE scheme is based on the decisional bilinear Diffie-Hellman (DBDH) assumption. Moreover, our scheme can be readily translated into one with security under the computational bilinear Diffie-Hellman (CBDH) assumption. The CBDH assumption is weaker compared to DBDH in the sense that DBDH implies CBDH, but not vice versa. These assumptions are defined below.

Decisional/Computational Bilinear Diffie-Hellman (DBDH/CBDH)

For a security parameter $\lambda \in \mathbb{N}$, let $G=(q, \mathbb{G}, \mathbb{G}_T, g, e) \leftarrow \mathcal{G}(1^\lambda)$ be a bilinear group. The DBDH assumption states that for any PPT adversary, there exists a negligible function negl such that for any security parameter $\lambda \in \mathbb{N}$ $Adv_{\mathcal{A}}^{DBDH}(\lambda) = |Pr[1 \leftarrow \mathcal{A}(1^\lambda, G, g^a, g^b, g^c, \tau)|G \leftarrow \mathcal{G}(1^\lambda); a,b,c \leftarrow \mathbb{Z}_q; \tau = e(g,g)^{abc}] - Pr[1 \leftarrow \mathcal{A}(1^\lambda, G, g^a, g^b, g^c, \tau)|G \leftarrow \mathcal{G}(1^\lambda); a,b,c \leftarrow \mathbb{Z}_q; \tau \leftarrow \mathbb{G}_T]| \leq negl(\lambda)$.

On the other hand, the CBDH assumption states that for any PPT adversary, there exists a negligible function negl such that for any security parameter $\lambda \in \mathbb{N}$.

$Adv_{\mathcal{A}}^{CBDH}(\lambda) = Pr[e(g,g)^{abc} \leftarrow \mathcal{A}(1^\lambda, G, g^a, g^b, g^c)|G \leftarrow \mathcal{G}(1^\lambda); a,b,c \leftarrow \mathbb{Z}_q] \leq negl(\lambda)$ Access Structures and Linear Secret Sharing Schemes In this subsection, we present the formal definitions of access structures and linear secret-sharing schemes.

Definition 1 (Access Structures)

Let $\mathbb{U}$ be the attribute universe. An access structure on $\mathbb{U}$ is a collection $\mathbb{A} \subseteq 2^\mathbb{U} \setminus \emptyset$ of non-empty sets of attributes. The sets in $\mathbb{A}$ are called the authorized sets and the sets not in $\mathbb{A}$ are called the unauthorized sets. An access structure is called monotone if $\forall B, C \in 2^\mathbb{U}$ if $B \in \mathbb{A}$ and $B \subseteq C$, then $C \in \mathbb{A}$.

Definition 2 (Linear Secret Sharing Schemes (LSSS))

Let $q=q(\lambda)$ be a prime and $\mathbb{U}$ the attribute universe. A secret sharing scheme $\Pi$ with domain of secrets $\mathbb{Z}_q$ for a monotone access structure $\mathbb{A}$ over $\mathbb{U}$, a.k.a. a monotone secret sharing scheme, is a randomized algorithm that on input a secret $z \in \mathbb{Z}_q$ outputs $|\mathbb{U}|$ shares $sh_1, \ldots, sh_{|\mathbb{U}|}$ such that for any set $S \in \mathbb{A}$ the shares $\{sh_i\}_{i \in S}$ determine z and other sets of shares are independent of z (as random variables). A secret-sharing scheme $\Pi$ realizing monotone access structures on $\mathbb{U}$ is linear over $\mathbb{Z}_q$ if 1. The shares of a secret $z \in \mathbb{Z}_q$ for each attribute in $\mathbb{U}$ form a vector over $\mathbb{Z}_q$.
2. For each monotone access structure $\mathbb{A}$ on $\mathbb{U}$, there exists a matrix $M \in \mathbb{Z}_q^{\ell \times s}$, called the share-generating matrix, and a function $\rho:[\ell] \to \mathbb{U}$, that labels the rows of M with attributes from $\mathbb{U}$ which satisfy the following: During the generation of the shares, we consider the vector $v=(z, r_2, \ldots, r_s)$, where $r_2, \ldots, r_s \leftarrow \mathbb{Z}_q$. Then the vector of $\ell$ shares of the secret z according to $\Pi$ is given by $\mu = Mv^T \in \mathbb{Z}_q^{\ell \times 1}$, where for all $j \in [\ell]$ the share $\mu_j$ "belongs" to the attribute $\rho(j)$. We will be referring to the pair (M, $\rho$) as the LSSS policy of the access structure $\mathbb{A}$.

The correctness and security of a monotone LSSS are formalized in the following: Let S (resp. S') denote an authorized (resp. unauthorized) set of attributes according to some monotone access structure $\mathbb{A}$ and let I (resp. I') be the set of rows of the share generating matrix M of the LSSS policy pair (M, $\rho$) associated with $\mathbb{A}$ whose labels are in S (resp. S'). For correctness, there exist constants $\{w_i\}_{i \in I}$ in such that for any valid shares $\{\mu_i = (Mv^T)_i\}_{i \in I}$ of a secret $z \in \mathbb{Z}_q$ according to $\Pi$, it is true that $\Sigma_{i \in I} w_i \mu_i = z$ (equivalently, $$\sum_{i \in I} w_i M_i = (1, \overbrace{0, \ldots, 0}^{s-1}),$$

where $M_i$ is the ith row of M). For soundness, there are no such $w_i$'s, as above. Additionally, there exists a vector $d \in \mathbb{Z}_q^{1 \times s}$, such that its first component $d_1=1$ and $M_i \cdot d=0$ for all $i \in I'$.

NC$^1$ and Monotone LSSS

Consider an access structure $\mathbb{A}$ described by an NC$^1$ circuit. There is a folklore transformation that can convert this circuit by a Boolean formula of logarithmic depth that consists of (fan-in 2) AND, OR, and (fan-in 1) NOT gates. We can further push the NOT gates to the leaves using De Morgan laws, and assume that internal nodes only constitute of OR and AND gates and leaves are labeled either by attributes or their negations. In other words, we can represent any NC$^1$ policy over a set of attributes into one described by a monotone Boolean formula of logarithmic depth over the same attributes and their negations. Lewko and Waters presented a monotone LSSS for access structures described by monotone Boolean formulas. This implies that any NC$^1$ access policy can be captured by a monotone LSSS.

We can use the following information theoretic property of LSSS access policies in the security proof of our MA-ABE scheme. This lemma allows the simulator of our reduction to isolate an unauthorized set of rows of the challenge LSSS matrix submitted by the adversary and essentially ignore it throughout the security reduction. The rows of the challenge LSSS matrix corresponding to the corrupt authorities will constitute the unauthorized set in the application of the lemma.

Lemma 1

Let (M, $\rho$) be an LSSS access policy, where $M \in \mathbb{Z}_q^{\ell \times s}$. Let $\mathcal{C} \subset [\ell]$ be a non-authorized subset of row indices of M. Let $c \in \mathbb{N}$ be the dimension of the subspace spanned by the rows of M corresponding to indices in $\mathcal{C}$. Then, there exists an access policy (M', $\rho$) such that the following holds:

The matrix $M'=(M'_{i,j})_{\ell \times s} \in \mathbb{Z}_q^{\ell \times s}$ satisfies $M'_{i,j}=0$ for all (i, j) $\in \mathcal{C} \times [s-c]$.

For any subset $\mathcal{S} \subset [\ell]$, if the rows of M having indices in $\mathcal{S}$ are linearly independent, then so are the rows of M' with indices in $\mathcal{S}$.

The distribution of the shares $\{\mu_x\}_{x \in [\ell]}$ sharing a secret $z \in \mathbb{Z}_q$ generated with the matrix M is the same as the distribution of the shares $\{\mu'_x\}_{x \in [\ell]}$ sharing the same secret z generated with the matrix M'.

Decentralized MA-ABE for LSSS

A decentralized multi-authority attribute-based encryption (MA-ABE) system MA-ABE=(GlobalSetup, AuthSetup, KeyGen, Enc, Dec) for access structures captured by linear secret sharing schemes (LSSS) over some finite field $\mathbb{Z}_q$ with $q=q(\lambda)$ consists of five procedures with the following syntax. We denote by $\mathcal{AU}$ the authority universe and by $\mathcal{GID}$ the universe of global identifiers of the users. Additionally, we assume that each authority controls just one attribute, and hence we would use the words "authority" and "attribute" interchangeably. This definition naturally generalizes to the situation in which each authority can potentially control an arbitrary number of attributes.

GlobalSetup($1^\lambda$) $\mapsto$ GP: The global setup algorithm takes in the security parameter $\lambda$ in unary and outputs the global public parameters GP for the system. We assume that GP includes the descriptions of the universe of attribute authorities $\mathcal{AU}$ and universe of the global identifiers of the users $\mathcal{GID}$.

AuthSetup(GP, u) $\mapsto$ ($PK_u$, $SK_u$): The authority $u \in \mathcal{AU}$ calls the authority setup algorithm during its initialization with the global parameters GP as input and receives back its public and secret key pair $PK_u$, $SK_u$.

KeyGen(GP, GID, $SK_u$) $\mapsto$ $SK_{GID,u}$: The key generation algorithm takes as input the global parameters GP, a user's global identifier GID $\in \mathcal{GID}$, and a secret key $SK_u$ of an authority $u \in \mathcal{AU}$. It outputs a secret key $SK_{GID,u}$ for the user.

Enc(GP, msg, (M, $\rho$), $\{PK_u\}$) $\mapsto$ CT: The encryption algorithm takes in the global parameters GP, a message msg, an LSSS access policy (M, $\rho$) such that M is a matrix over $\mathbb{Z}_q$ and $\rho$ is a row-labeling function that assigns to each row of M an attribute/authority in $\mathcal{AU}$, and the set $\{PK_u\}$ of public keys for all the authorities in the range of $\rho$. It outputs a ciphertext CT. We assume that the ciphertext implicitly contains (M, $\rho$).

Dec(GP, CT, $\{SK_{GID,u}\}$) $\mapsto$ msg': The decryption algorithm takes in the global parameters GP, a ciphertext CT generated with respect to some LSSS access policy (M, $\rho$), and a collection of keys $\{SK_{GID,u}\}$ corresponding to user ID-attribute pairs (GID, U) possessed by a user with global identifier GID. It outputs a message msg' when the collection of attributes associated with the secret keys $\{SK_{GID,u}\}$ satisfies the LSSS access policy (M, $\rho$), i.e., when the vector (1, 0, . . . , 0) is contained in the linear span of those rows of M which are mapped by $\rho$ to some attribute/authority $u \in \mathcal{AU}$ such that the secret key $SK_{GID,u}$ is possessed by the user with global identifier GID. Otherwise, decryption fails.

The Inventive MA-ABE Scheme from DBDH

In this section, the inventive MA-ABE scheme for access structures described by monotone LSSS under the DBDH assumption is presented. As noted below, this construction can be configured to get an MA-ABE scheme under the CBDH assumption. The scheme is associated with a universe of global identifiers $\mathcal{GID} \subset \{0,1\}^*$, a universe of authority identifiers $\mathcal{AU}$, and we will use the Lewko-Waters transformation to represent the DNF access policies as monotone LSSS. We will assume each authority controls only one attribute in our scheme. However, it can be readily generalized to a scheme where each authority controls an a priori bounded number of attributes using standard techniques. Further, we will assume that all access policies (M, ρ) used in our scheme correspond to a matrix M with at most $s_{max}$ columns and an injective row-labeling function ρ, i.e., an authority/attribute is associated with at most one row of M. Note that following a simple encoding technique, we can alleviate the injective restriction on the row labeling functions to allow an authority/attribute to appear an a priori bounded number of times within the LSSS access policies.

GlobalSetup($1^\lambda$, $s_{max}$)

The global setup algorithm takes in the security parameter $1^\lambda$ encoded in unary and the maximum width of an LSSS matrix supported by the scheme $s_{max}=s_{max}(\lambda)$. The procedure runs the bilinear group generator $\mathcal{G}(\lambda)$ to generate a suitable bilinear group G=(q, $\mathbb{G}$, $\mathbb{G}_T$, g, e) of prime order q. The global parameters GP consists of the description of the bilinear group G. Furthermore, we assume a hash function H: $\mathcal{GID} \times [s_{max}] \to \mathbb{G}$ mapping strings (GID, i)$\in \mathcal{GID} \times [s_{max}]$ to elements in $\mathbb{G}$.

AuthSetup(GP, H, u)

Given the global parameters GP, the hash function H, and an authority index $u \in \mathcal{AU}$, the algorithm chooses $a_u$, $y_{u,2}, \ldots, y_{u,s_{max}} \leftarrow \mathbb{Z}_q$ and outputs $$PK_u = (e(g,g)^{\alpha_u}, g^{y_{u,2}}, \ldots, g^{y_{u,s_{max}}}) \quad MSK_u = (\alpha_u, y_{u,2}, \ldots, y_{u,s_{max}}).$$

KeyGen(GP, H, GID, $MSK_u$)

The key generation algorithm takes as input the global parameters GP, the hash function H, the user's global identifier GID, and the authority's secret key $MSK_u$. It outputs $$SK_{GID,u} = g^{\alpha_u} \prod_{j=2}^{s_{max}} H(GID\|j)^{y_{u,j}}.$$

Enc(GP, H, msg, (M, ρ), {$PK_u$})

The encryption algorithm takes as input the global parameters GP, the hash function H, a message msg$\in \mathbb{G}_T$ to encrypt, an LSSS access structure (M, ρ), where M= $(M_{i,j})_{\ell \times s_{max}} = (M_1, \ldots, M_\ell)^T \in \mathbb{Z}_q^{\ell \times s_{max}}$ and ρ:$[\ell] \to \mathcal{AU}$, and public keys of the relevant authorities {$PK_u$}. The function ρ associates rows of M to authorities (recall that we assume that each authority controls a single attribute). We assume that ρ is an injective function, that is, an authority/attribute is associated with at most one row of M. The procedure samples:

1. $r_1, \ldots, r_\ell \leftarrow \mathbb{Z}_q$,
2. $v=(z, v_2, \ldots, v_{s_{max}}) \leftarrow \mathbb{Z}_q^{s_{max}}$, and
3. $x=(x_2, \ldots, x_{s_{max}}) \leftarrow \mathbb{Z}_q^{s_{max}-1}$, and outputs $$CT=((M,\rho), C_0, \{C_{1,i}\}_{i\in[\ell]}, \{C_{2,i}\}_{i\in[\ell]}, \{C_{3,i,j}\}_{i\in[\ell], j\in\{2,\ldots,s_{max}\}}),$$

where $C_0 = e(g,g)^z$ msg $\forall i \in [\ell]: C_{1,i} = e(g,g)^{M_i \cdot v} e(g,g)^{\alpha_{\rho(i)} r_i}, C_{2,i} = g^{r_i}$ $\forall i \in [\ell], j \in \{2, \ldots, s_{max}\}: C_{3,i,j} = g^{y_{\rho(i),j} r_i} g^{M_{i,j} x_j}.$ Dec(GP, H, CT, GID, {$SK_{GID,u}$})

Decryption takes as input the global parameters GP, the hash function H, a ciphertext CT for an access structure (M, ρ) with M$\in \mathbb{Z}_q^{\ell \times s_{max}}$ and ρ:$[\ell] \to \mathbb{U}$ injective, and the secret keys {$SK_{GID,\rho(i)}$}$_{i \in I}$ corresponding to a subset of rows of M with indices I$\subseteq[\ell]$. If $(1, 0, \ldots, 0)$ is not in the span of these rows, $M_I$, then decryption fails. Otherwise, the decryptor finds {$w_i$}$_{i \in I}$ such that $(1, 0, \ldots, 0) = \Sigma_{i \in I} w_i M_i$. The decryption algorithm, letting ρ(i) for i$\in$I be the corresponding authority, computes and outputs $$C_0 / \prod_{i \in I} \left[ \frac{C_{1,i} \cdot \prod_{j=2}^{s_{max}} e(H(GID\|j), C_{3,i,j})}{e(SK_{GID,\rho(i)}, C_{2,i})} \right]^{w_i}.$$

The MA-ABE Scheme from CBDH

The above construction can be readily modified into one that is provably secure under the CBDH assumption. Let $\mathcal{H}$ be a hardcore bit function for the CBDH problem, that is given a CBDH instance consisting of the group description G=(q, $\mathbb{G}$, $\mathbb{G}_T$, g, e) and three group elements $g^a, g^b, g^c \in \mathbb{G}$ for a, b, c$\leftarrow \mathbb{Z}_q$, the output of $\mathcal{H}$ is defined to be a computationally hard bit in the binary representation of the target $e(g,g)^{abc}$. For the modified construction, let us consider the message space to be {0, 1} (for simplicity) as opposed to $\mathbb{G}_T$ in the construction above. We modify the component $C_0$ of the ciphertext as follows. While encrypting a message msg$\in \{0, 1\}$, we compute $C_0$ as $C_0 = \mathcal{H}(e(g,g)^z) \oplus$ msg where $\oplus$ denotes addition modulo 2. The other ciphertext components are computed as above. The authority public/secret keys and the user's secret keys are also computed identically to the above scheme.

System Implementation

With reference to FIG. 1, an example system architecture for a decentralized multi-authority attribute-based encryption scheme is illustrated. The Owner 105 of a message, such any arbitrary data, can encrypt the message as described herein and store the resulting ciphertext in a Cloud Storage 110. Another user, illustrated as Accessor 115, may retrieve this ciphertext from Cloud Storage 110. Multiple Authorities 120 may be instantiated for managing public and secret keys. The Authorities 120 may distribute private key to data Owner 105, and secret keys to Accessor 115. As described herein, the user can only decrypt the ciphertext if the user has at least the predetermined number of attributes from the requisite authorities.

Figure 2:
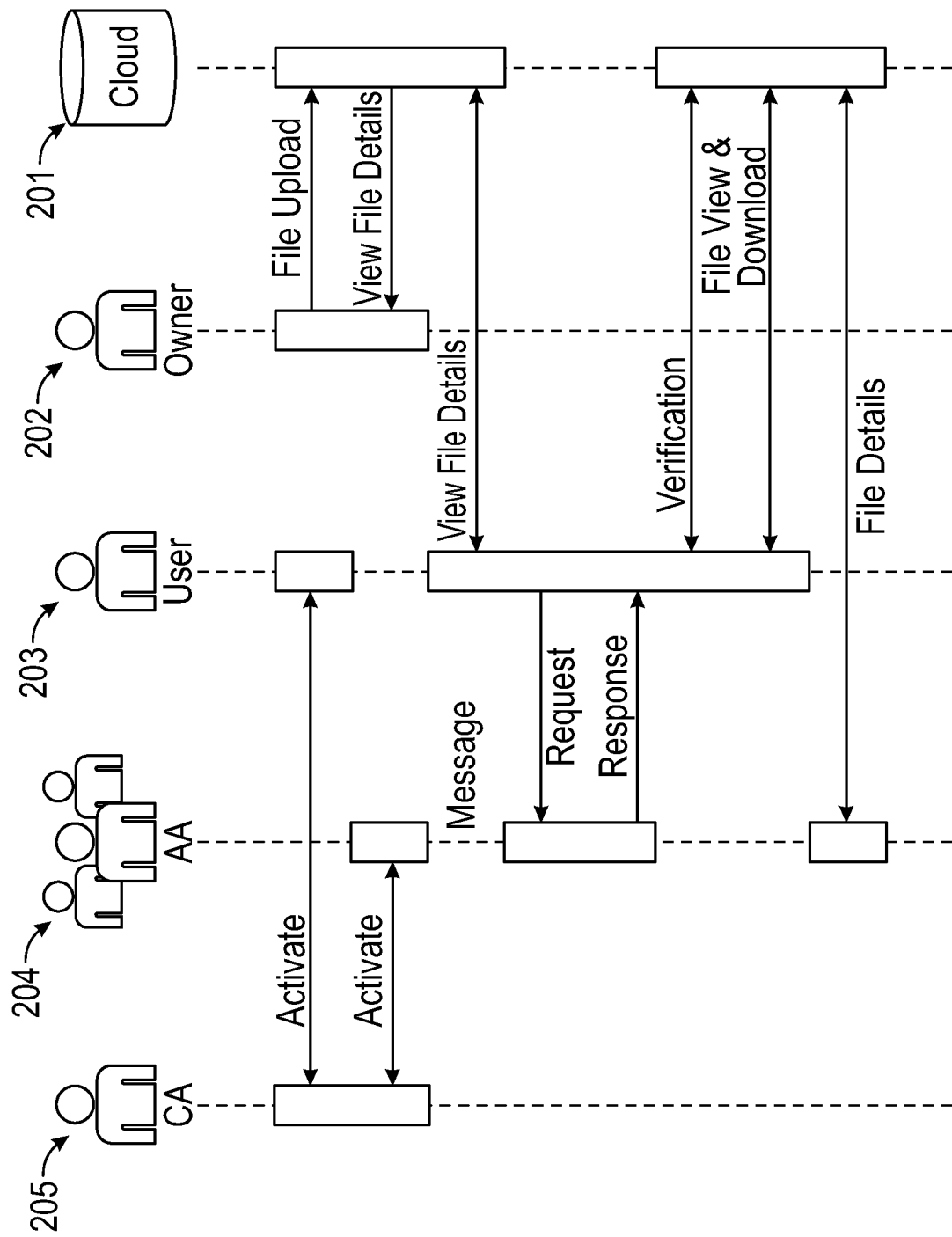
FIG. 2 illustrates an example sequence diagram for a decentralized multi-authority attribute-based encryption scheme.

With reference to FIG. 2, an example sequence diagram for a decentralized multi-authority attribute-based encryption scheme is illustrated. Arbitrary data may be stored in Cloud 201. Data Owner 202 may have caused the data to be uploaded to the cloud. Subsequently, User 203 may wish to obtain the data from the Cloud 201. User 203 may initially view file details and request a key from Authority 204. While only a single Authority 204 is illustrated here, multiple authorities can be instantiated and the user may be in communication with multiple of the authorities.

Figure 3:
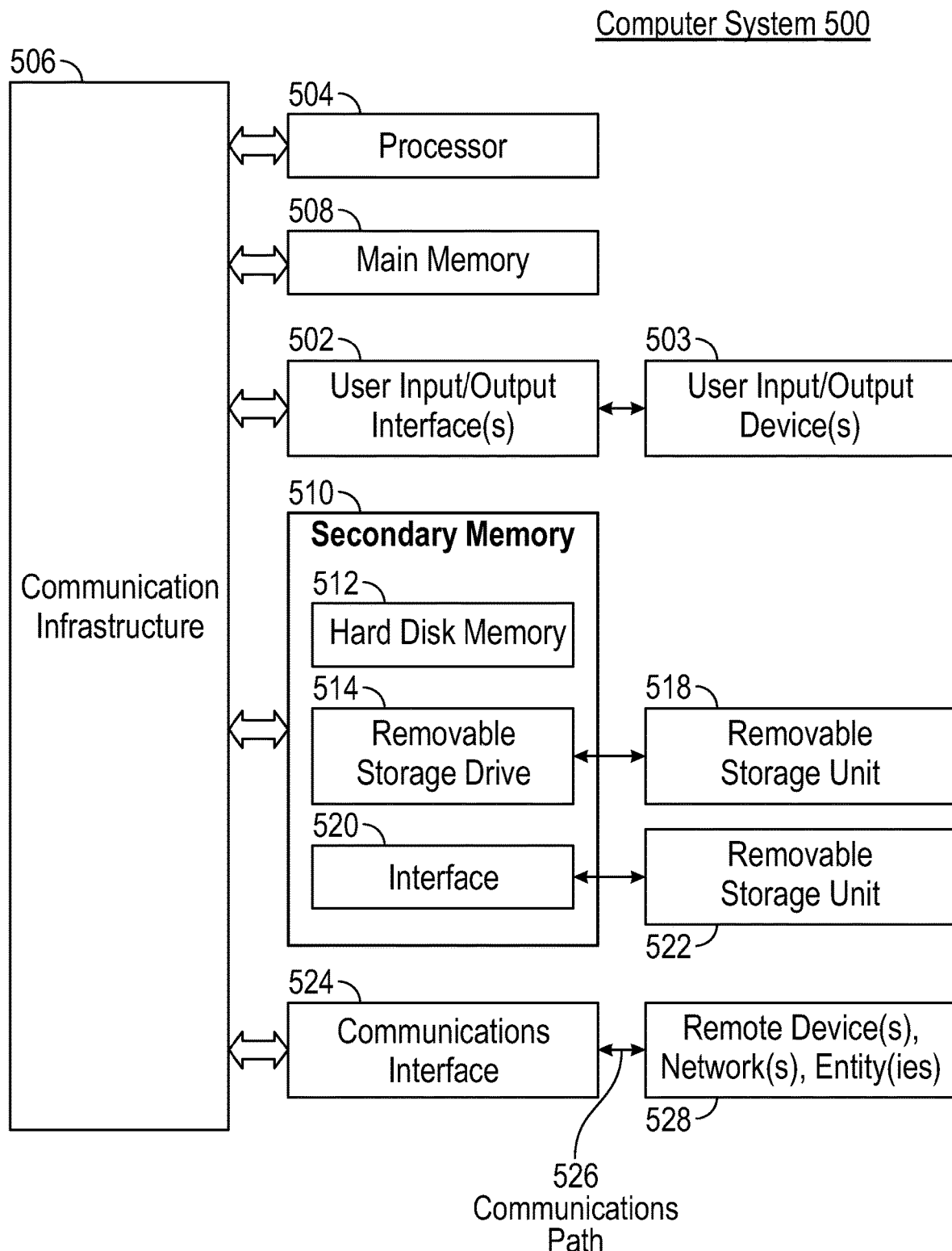
FIG. 3 illustrates an example computer system architecture for implementing the claimed systems and methods.
Figure 4:
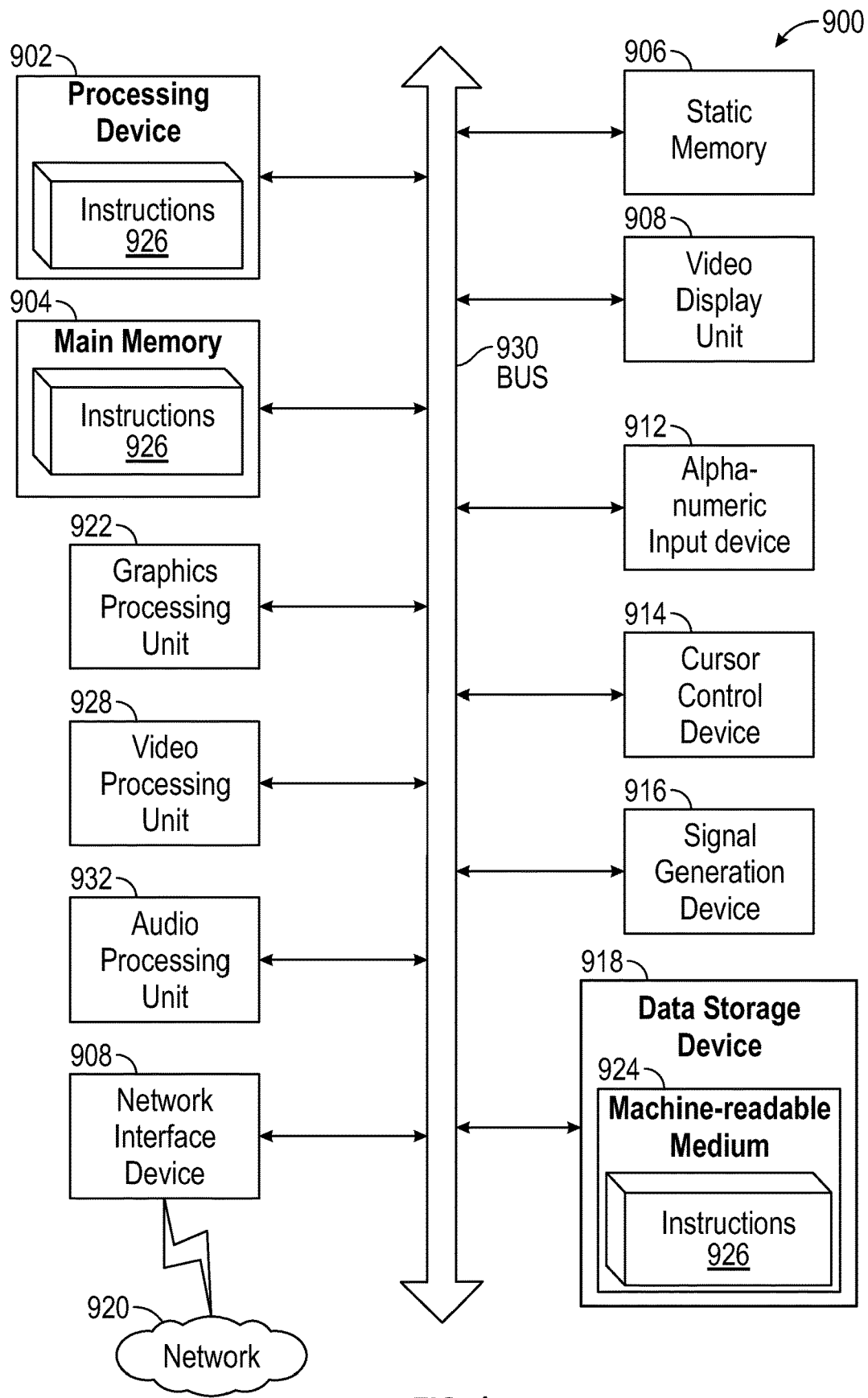
FIG. 4 illustrates further details of an example computer system architecture for implementing the claimed systems and methods.

FIGS. 3 and 4 depict example computer systems useful for implementing various embodiments described in the present disclosure. Various embodiments may be implemented, for example, using one or more computer systems, such as computer system 500 shown in FIG. 3. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity (ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 4 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 3 and 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A computerized method for encrypting a message according to a multi-authority attribute-based encryption scheme, the method comprising:
   storing an electronic message m comprising $m_i$ bits for encryption in a computerized storage media;
   executing a global setup algorithm to generate global parameters by selecting a cryptographic bilinear group G and a cryptographic hash function H, wherein the group G comprises a generator g, and a bilinear map e, and further wherein h=e (g, g). wherein e is a bilinear pairing mapping two source group elements to a target group element. and H is a hash function that maps inputs to elements in the source group;
   executing an authority setup algorithm to generate a public and secret key pair, by:
   generating values a, $y_2, \ldots, y_s$, wherein a is a secret value used for key generation and y values are secret components used in binding an attribute with the global identifier of a user while issuing a secret key; and
   setting the public key to be ($h^a, g^{\{y_2\}}, \ldots g^{\{y_s 56\}}$) and the secret key to be (a, $y_2, \ldots y_s$), wherein the public key contains transformed versions of the secret values;
   executing a key generation algorithm given a user global identifier (GID), wherein GID uniquely identifies a user in the system, by:
   computing B=H (GID, 2)$^{\{y_2\}}$* H(GID, 3)$^{\{y_3\}}$* $\ldots$ * H(GID, s)$^{\{y_{ss}\}}$, wherein H(GID, j) is a hashed group element for the user GID and index j, and each y value is a secret component used in binding attributes;
   outputting $g^a$* B as a secret key k. wherein k is a secret key associated with GID that will be used for decryption;
   executing an encryption algorithm for the message m, the message m structured as one or more group elements, on access policy M, wherein M defines which attributes are required for decryption, by:
   for each group element $m_i$ of message m:
   generating an integer r, wherein r is a random value;
   generating a vector of integers v=(z, $v_2, \ldots, v_s$), wherein v is a vector used in the encryption process to encode the access policy;
   generating a vector of integers x=($x_2, \ldots, x_s$), wherein x contains random values used to secure different components of the ciphertext;
   computing: $C_0 = h^z * m_i$, wherein $C_n$ is an encrypted version of the message m;
   $C_1 = h^{\{M*v\}} * h^{\{a*r\}}$, wherein $C_1$ is a ciphertext group element that encodes the access policy;
   $C_2 = g^r$, wherein $C_2$ is a ciphertext component in the source group that provides information of the randomness used;
   and for every j in 2 . . . s:
   $C'_j = g^{\{v*r\}} * g^{\{M_j*_j\}}$, wherein each $C'_j$ is a ciphertext component in the source group which can be combined based on the possessed attributes during decryption; and
   storing ($C_0, C_1, C_2, C'_2, \ldots C'_s$) as the encrypted message of $m_i$ in a computerized media.

2. The method of claim 1, further comprising distributing the secret key over a communications network by only one authority.

3. The method of claim 1, wherein each user is identified by a set of attributes and a decryption ability for each encrypted message is based on a function of the attributes.

4. The method of claim 3, further comprising distributing the secret key k over a communications network by any polynomial number of independent authorities.

5. The method of claim 4, further comprising selecting, for each independent authority, a predetermined number and a set of attributes whereby the user can only decrypt the message m if the user has at least the predetermined number of attributes from each authority.

6. A computerized method for decrypting an encrypted message in a decentralized multi-authority attribute-based encryption system, the method comprising:
   storing a ciphertext C in a computerized storage medium, wherein the ciphertext C comprises group elements $(C_0, C_1, C_2, C'_2, \ldots C'_s)$, and wherein the ciphertext C has been encrypted according to the attribute-based encryption scheme;

retrieving a secret key k from the computerized storage media, wherein secret key k is generated by a key generation algorithm binding k to the user's global identifier GID via a cryptographic hash function H, wherein H maps (GID, j) to an element in a source group for each integer j;

executing a decryption algorithm given a user global identifier (GID), wherein:

to decrypt the $i^{th}$ group element of the message:

computing $D=e(H (GID, 2), C'_2)* \ldots * e(H(GID, s), C'_s)$, wherein e is a bilinear pairing mapping two source group elements to a target group element, H (GID, j) is a hashed group element for the user GID and index j, and each Cj is a ciphertext component in the source group;

computing $F=C_1*D$, wherein C1 is a ciphertext group element that, when multiplied by D, yields an intermediate factor used in unmasking the plaintext;

computing $J=e (k, C_2)$, wherein k is a secret key associated with GID, and C2 is a ciphertext component in the source group so that J is a target group element facilitating decryption;

computing $C_0* J/F$ to obtain a recovered plaintext m, wherein C0 is an encrypted version of the message m, J is the partial decryption value, F is the intermediate factor used in unmasking, and "/" denotes a group operation that inverts F in the same group domain, thereby producing the plaintext m; and storing the recovered plaintext message m in the computerized storage media.

7. The method of claim 6, further comprising distributing the secret key k over a communications network by only one authority.

8. The method of claim 7, wherein each user is identified by a set of attributes and a decryption ability for each encrypted message is based on a function of the attributes.

9. The method of claim 8, further comprising distributing the secret key k over a communications network by any polynomial number of independent authorities.

10. The method of claim 9, further comprising selecting, for each independent authority, a predetermined number and a set of attributes whereby the user can only decrypt the message m if the user has at least the predetermined number of attributes from each authority.

11. A system for encrypting a message according to a multi-authority attribute-based encryption scheme, the system comprising a processor configured for:

storing an electronic message m comprising $m_i$ bits for encryption in a computerized storage media;

executing a global setup algorithm to generate global parameters by selecting a cryptographic bilinear group G and a cryptographic hash function H, wherein the group G comprises a generator g, and a bilinear map e, and further wherein $h=e (g, g)$, wherein e is a bilinear pairing mapping two source group elements to a target group element. and H is a hash function that maps inputs to elements in the source group;

executing an authority setup algorithm to generate a public and secret key pair, by:

generating values a, $y_2, \ldots, y_s$, wherein a is a secret value used for key generation and y values are secret components used in binding an attribute with the global identifier of a user while issuing a secret key; and setting the public key to be $(h^a, g^{\{y_2\}}, \ldots g^{\{y_s 56\}})$ and the secret key to be $(a, y_2, \ldots y_s)$. wherein the public key contains transformed versions of the secret values;

executing a key generation algorithm given a user global identifier (GID), wherein GID uniquely identifies a user in the system, by:

computing $B=H (GID, 2)^{\{y_2\}}* H(GID, 3)^{\{y_3\}}* \ldots * H(GID, s)^{\{y_{ss}\}}$, wherein H(GID, j) is a hashed group element for the user GID and index j, and each y value is a secret component used in binding attributes;

outputting $g^a* B$ as a secret key k. wherein k is a secret key associated with GID that will be used for decryption;

executing an encryption algorithm for the message m, the message m structured as one or more group elements, on access policy M, wherein M defines which attributes are required for decryption, by:

for each group element $m_i$ of message m:

generating an integer r, wherein r is a random value;

generating a vector of integers $v=(z, v_2, \ldots, v_s)$, wherein v is a vector used in the encryption process to encode the access policy;

generating a vector of integers $x=(x_2, \ldots, x_s)$, wherein x contains random values used to secure different components of the ciphertext;

computing: $C_0=h^z* m_i$, wherein $C_n$ is an encrypted version of the message m;

$C_1=h^{\{M*v\}}* h^{\{a*r\}}$, wherein $C_1$ is a ciphertext group element that encodes the access policy;

$C_2=g^r$, wherein $C_2$ is a ciphertext component in the source group that provides information of the randomness used;

and for every j in 2 . . . s:

$C'_j=g^{\{v*r\}}* g^{\{M_j*_j\}}$, wherein each $C'_j$ is a ciphertext component in the source group which can be combined based on the possessed attributes during decryption; and storing $(C_0, C_1, C_2, C'_2, \ldots C'_s)$ as the encrypted message of $m_i$ in a computerized media.

12. The system of claim 11, further comprising distributing the secret key over a communications network by only one authority.

13. The method of claim 11, wherein each user is identified by a set of attributes and a decryption ability for each encrypted message is based on a function of the attributes.

14. The method of claim 13, further comprising distributing the secret key k over a communications network by any polynomial number of independent authorities.

15. The method of claim 14, further comprising selecting, for each independent authority, a predetermined number and a set of attributes whereby the user can only decrypt the message m if the user has at least the predetermined number of attributes from each authority.

16. A computerized system for decrypting an encrypted message in a decentralized multi-authority attribute-based encryption system, the method comprising:

storing a ciphertext C in a computerized storage medium, wherein the ciphertext C comprises group elements $(C_0, C_1, C_2, C'_2, \ldots C'_s)$, and wherein the ciphertext C has been encrypted according to the attribute-based encryption scheme;

retrieving a secret key k from the computerized storage media, wherein secret key k is generated by a key generation algorithm binding k to the user's global identifier GID via a cryptographic hash function H, wherein H maps (GID, j) to an element in a source group for each integer j;

executing a decryption algorithm given a user global identifier (GID), wherein:

to decrypt the $i^{th}$ group element of the message:

computing $D = e(H(GID, 2), C'_2) * \ldots * e(H(GID, s), C'_s)$, wherein e is a bilinear pairing mapping two source group elements to a target group element, $H(GID, j)$ is a hashed group element for the user GID and index j, and each Ci is a ciphertext component in the source group;

computing $F = C_1 * D$, wherein C1 is a ciphertext group element that, when multiplied by D, yields an intermediate factor used in unmasking the plaintext;

computing $J = e(k, C_2)$, wherein k is a secret key associated with GID, and C2 is a ciphertext component in the source group so that J is a target group element facilitating decryption;

computing $C_0 * J/F$ to obtain a recovered plaintext m, wherein C0 is an encrypted version of the message m, J is the partial decryption value, F is the intermediate factor used in unmasking, and "/" denotes a group operation that inverts F in the same group domain, thereby producing the plaintext m; and storing the recovered plaintext message m in the computerized storage media.

17. The system of claim 16, further comprising distributing the secret key k over a communications network by only one authority.

18. The system of claim 17, wherein each user is identified by a set of attributes and a decryption ability for each encrypted message is based on a function of the attributes.

19. The system of claim 18, further comprising distributing the secret key k over a communications network by any polynomial number of independent authorities.

20. The system of claim 19, further comprising selecting, for each independent authority, a predetermined number and a set of attributes whereby the user can only decrypt the message m if the user has at least the predetermined number of attributes from each authority.

* * * * *